United States Patent [19]

Sandiford et al.

[11] Patent Number: 4,665,987
[45] Date of Patent: May 19, 1987

[54] PREPARTIALLY CROSSLINKED GEL FOR RETARDING FLUID FLOW

[75] Inventors: Burton B. Sandiford, Balboa Island, Calif.; Chji-Shyoung Chiou, Tulsa, Okla.

[73] Assignee: Cities Serice Oil and Gas Corporation, Tulsa, Okla.

[21] Appl. No.: 822,479

[22] Filed: Jan. 24, 1986

Related U.S. Application Data

[63] Continuation-in-part of Ser. No. 624,113, Jun. 25, 1984, abandoned.

[51] Int. Cl.$^4$ .................. E21B 33/38; E21B 43/24
[52] U.S. Cl. .................. 166/288; 166/295; 166/300; 523/130; 405/264; 405/270
[58] Field of Search ............... 166/288, 294, 295, 303, 166/300; 523/130

[56] References Cited

U.S. PATENT DOCUMENTS

| | | | |
|---|---|---|---|
| Re. 30,767 | 10/1981 | Felber et al. | 166/261 |
| Re. 31,748 | 11/1984 | Block | 252/8.5 A |
| 2,249,538 | 7/1941 | McDowell et al. | 524/291 |
| 2,311,059 | 2/1943 | Lowe | 524/291 X |
| 2,366,036 | 12/1944 | Leverett et al. | 166/295 |
| 2,562,866 | 7/1951 | Kurtz, Jr. | 523/130 |
| 2,720,501 | 10/1955 | Van Ness | 260/73 |
| 2,832,414 | 4/1958 | Battle . | |
| 2,864,448 | 12/1958 | Bond et al. . | |
| 3,079,337 | 2/1963 | Turbak et al. . | |
| 3,080,207 | 3/1963 | Tanabe | 8/115.5 |
| 3,251,795 | 5/1966 | Fukushima et al. | 260/29.6 |
| 3,265,536 | 8/1966 | Miller et al. . | |
| 3,265,657 | 8/1966 | Sinclair . | |
| 3,396,790 | 8/1968 | Eaton . | |
| 3,421,584 | 1/1969 | Eilers et al. . | |
| 3,452,817 | 7/1969 | Fallgatter | 166/305 R |
| 3,554,287 | 1/1971 | Eilers et al. | 166/295 |
| 3,640,734 | 2/1972 | Oppenheimer et al. | 99/176 |
| 3,658,745 | 4/1972 | Merrill et al. . | |
| 3,663,470 | 5/1972 | Nishimura et al. | 260/2.5 F |
| 3,741,307 | 6/1973 | Sandiford et al. | 166/273 |
| 3,749,172 | 7/1973 | Hessert et al. | 166/274 |
| 3,757,863 | 9/1973 | Clampitt et al. | 166/270 X |
| 3,762,476 | 10/1973 | Gall | 166/294 |
| 3,785,437 | 1/1974 | Clampitt et al. | 166/281 |
| 3,794,115 | 2/1974 | Skagerberg | 166/294 |
| 3,795,276 | 3/1974 | Eilers et al. | 166/295 |
| 3,859,269 | 1/1975 | Maurer . | |
| 3,875,074 | 4/1975 | Vassiliades et al. | 252/316 |
| 3,912,529 | 10/1975 | Katan: et al. | 106/187 |
| 3,926,918 | 12/1975 | Shibata et al. | 260/73 L |
| 3,941,730 | 3/1976 | Solenberger . | |
| 4,498,540 | 2/1985 | Marrocco | 166/295 |

(List continued on next page)

FOREIGN PATENT DOCUMENTS

| | | |
|---|---|---|
| 950355 | 7/1974 | Canada . |
| 356408 | 9/1931 | United Kingdom .......... 525/61 |
| 2073228 | 10/1981 | United Kingdom . |
| 2074636A | 11/1981 | United Kingdom . |

OTHER PUBLICATIONS

Journal of Colloid & Interface Science, vol. 90, No. 1, Nov. 1982, pp. 34-43.
Journal of the Electrochemical Society, vol. 130, No. 2, Feb. 1983, pp. 255-259.
U.S. Government Doc. N81-29531, (NASA Case No. LEW-13, 102-1).

Primary Examiner—George A. Suchfield
Attorney, Agent, or Firm—F. Eugene Logan; William N. Patrick

[57] ABSTRACT

A gel-forming composition is provided comprising a PVA based substance selected from the group consisting of a polyvinyl alcohol, a polyvinyl alcohol copolymer, and mixtures thereof, aldehyde, and water. The gel-forming compositions are preheated to effect a predetermined amount of partial crosslinking of the PVA based substance and the aldehyde thereby enabling a lower aldehyde concentration to be used which in turn produces a more stable gel. The gel-forming compositions are useful for retarding the flow of fluids in subterranean formations. For example, for retarding the flow of water in high permeability channels in oil reservoirs. The gels and method of use herein provided are particularly useful in waterflood operations to increase the sweep efficiency of the oil recovery process.

39 Claims, 2 Drawing Figures

U.S. PATENT DOCUMENTS

| | | | |
|---|---|---|---|
| 4,015,995 | 4/1977 | Hess | 166/295 X |
| 4,018,286 | 4/1977 | Gall et al. | 166/295 |
| 4,039,029 | 8/1977 | Gall | 166/294 |
| 4,040,258 | 8/1977 | Argabright et al. | 166/295 X |
| 4,098,337 | 7/1976 | Argabright et al. | 166/270 |
| 4,154,912 | 5/1979 | Phillips et al. | 526/7 |
| 4,262,067 | 4/1981 | Phillips et al. | 525/61 X |
| 4,272,470 | 6/1981 | Hsu et al. | 525/61 X |
| 4,336,145 | 6/1982 | Briscoe | 252/8.55 R |
| 4,349,443 | 9/1982 | Block | 252/8.5 A |
| 4,353,804 | 10/1982 | Green et al. | 252/8.5 A |
| 4,376,183 | 3/1983 | Haskell | 524/417 |
| 4,385,155 | 5/1983 | Michaels | 525/61 |
| 4,389,319 | 6/1983 | Block et al. | 252/8.5 A |
| 4,411,800 | 10/1983 | Green et al. | 252/8.5 A |
| 4,424,302 | 1/1984 | Block et al. | 252/8.5 A |
| 4,428,845 | 1/1984 | Block | 525/58 |
| 4,447,341 | 5/1984 | Block | 252/8.5 A |
| 4,472,552 | 9/1984 | Blouin | 525/61 |
| 4,473,480 | 9/1984 | Green et al. | 252/8.5 A |
| 4,485,875 | 12/1984 | Falk | 166/295 |
| 4,486,318 | 12/1984 | Green et al. | 252/8.5 A |

PREPARTIALLY CROSSLINKED GEL FOR RETARDING FLUID FLOW

RELATED APPLICATIONS

This application is a continuation-in-part application of Ser. No. 624,113 filed June 25, 1984, now abandoned, which is incorporated herein by reference.

The subject matter of this application is related to that of commonly assigned U.S. Pat. No. 4,498,540 for "Gel for Retarding Water Flow" which is hereby incorporated herein by reference; and commonly assigned U.S. patent application Ser. No. 624,111 filed June 25, 1984, now abandoned, for "GEL AND PROCESS FOR RETARDING FLUID FLOW" by B. B. Sandiford and R. Zillmer, which is hereby incorporated herein by reference.

TECHNICAL FIELD

This invention relates to gels, methods of forming gels, and uses for gels. A polyvinyl alcohol based-aldehyde hydrogel, or gel, is provided which is useful for immobilizing large volumes of earth or water. The gel can be used for reducing the permeability of soils and subterranean formations to the flow of fluids, waters or brines. The gels of this invention are particularly valuable in retarding the flow of fluids, waters or brines in hydrocarbon production from a wellbore, or from solar ponds.

BACKGROUND OF THE INVENTION

The recovery of hydrocarbons, both liquid and gaseous, from subterranean zones has frequently resulted in the simultaneous production of large quantities of water or brines. In some cases, even though substantial flows of hydrocarbons have been shown, water production is so great and water disposal costs so high, that hydrocarbon production is not economical. Such water production has in some cases been disposed of in an abandoned or dry well by separating such water from the hydrocarbons and reinjecting the separated water into such wells. Where a disposal well is not available nor near the producing well, pipelining the water product over a long distance to a disposal site can become so costly that it renders the well noncommercial. Even if a disposal well is close by, the disposal cost can still be very expensive. Therefore it is desirable to find a way to reduce or shut off the flow of water while permitting hydrocarbon production to continue.

It is well known that the production of large amounts of water from hydrocarbon producing wells is a major expense item in the overall hydrocarbon recovery cost. It is not uncommon for an oil well to produce an effluent which is 60–99% by volume water and only 1–40% by volume oil. In such situations, the major part of the pumping energy is expended in lifting water from the well, a cost which the producer would like to avoid if possible. The effluent must then be subjected to a costly separation procedure to recovery water-free hydrocarbons. The foul water separated therefrom also presents a troublesome and expensive disposal problem. Consequently, it is desirable to decrease the volume of water produced from hydrocarbon wells. It is, of course, desirable to be able to achieve this objective and at the same time not materially affect the hydrocarbon recovery rate. However, where the volume of water is very high, e.g., 80–99% water, and only 1–20% oil, even substantial reduction in hydrocarbon production can be tolerated if water production can be substantially reduced.

One such method of reducing the flow of water has been described in U.S. Pat. No. 3,762,476 wherein a first aqueous polymer solution selected from the group consisting of polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of Fe(II), Fe(III), Al(III), Ti(IV), Zn(II), Sn(IV), Ca(II), Mg(II), Cr(III), and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

Water produced from a wellbore can come from the infiltration of naturally occuring subterranean water as described above, or the water can come from injected water put into the formation in those hydrocarbon recovery processes which utilize waterflooding. U.S. Pat. No. 4,098,337 discloses a method for forming a hydroxymethylated polyacrylamide gel, in situ, to reduce the permeability of a thusly treated zone where the waterflood method of oil recovery is employed. In this case the gel was formed in situ by the injection of an aqueous polyacrylamide solution and an aqueous formaldehyde solution.

In waterflood operations it can be desirable to treat the water injector wells with a polymer gel forming solution to control and/or redirect the water flow profile. Such treatment can prevent channeling of water at the injector well and/or control or redirect the water flow through regions of varying permeability.

Although polyacrylamide-based gels can be effective in retarding water production or flow in some subterranean formations, polyacrylamide-based gels will not be stable or effective in all formations. In general, polyacrylamide-based gels will work satisfactorily in formations having a temperature below about 65° C. Above about 65° C., polyacrylamide-based gels become very sensitive to hardness of the brines, especially where hardness is above about 1000 ppm. The hardness of the water becomes a more detrimental factor the higher the temperature, thus for very hot regions even low hardness levels can render many gels ineffective. Formations which have a higher temperature, hardness, or total dissolved solids content above the aforementioned ranges usually are not capable of being successfully treated with polyacrylamide-based polymers to retard the flow of water.

Polyacrylamides usually are formulated with a dichromate which is reduced from a valence of plus six to plus three in which state the chromic ion then acts as the crosslinking agent for the polymer. There is growing concern that the use of dichromate in formulations for blocking the flow of fluids in subterranean formations might pollute aquifers. Thus there is a growing desire and need to replace formulations which contain dichromates, such as some polyacrylamides and lignosulfonates, with formulations which are dichromate free. The gel systems of this invention are dichromate free.

In many hydrocarbon producing wells temperatures of 80° C. or higher are often encountered. Formation waters frequently have hardnesses which exceed 1000 ppm. It is therefore desirable to develop a gel which can be used to retard or block the flow of water in subterranean formations having a temperature of 65° C. or higher, and a water hardness of 1000 ppm or higher.

In other flooding operations, rather than water, other fluids can be used. Some fluids which are used are carbon dioxide and steam. Because of the high temperature required in steam flooding or other steam stimulation methods, many of the gels used for blocking water are not suitable or satisfactory for blocking steam. Other steam treating methods such as "Push and Pull" operations, sometimes referred to as "cyclic steam injection" or "Huff and Puff" operations, where a production well is steamed for several days and then produced for a month or so result in steam channels being formed which if not blocked will result in an inefficient steaming operation due to loss of steam into channels which drain into nonproductive parts of the reservoir. Again because many of the existing gels degrade rapidly at steam temperatures, polymers such as polyacrylamides are generally not satisfactory. Other fluids such as carbon dioxide can also be used in push and pull operations.

Flooding operations using carbon dioxide and other gases as the drive fluid frequently experience a loss of drive fluid to nonproductive parts of the reservoir because of greater ability of gases to dissipate into such channel as opposed to liquids. Loss of drive gases in flooding operations and steam in stimulation methods is more difficult to prevent because the flow channels responsible for such losses can be very small in diameter or width thereby making it very difficult to fill such channels with a blocking agent. Some viscous plugging substances, even though they may have the desired stability at higher temperatures, are not able to penetrate and effectively fill narrow channels, particularly as such channels become more distant from the wellbore.

Thus there is a need for plugging fluids which can be formulated to penetrate deeply into the formation. The use of this invention addresses this problem and provides polyvinyl alcohol based gels which can be tailor made to the particular problem at hand and which can overcome many of the shortcomings of prior art plugging agents and gels.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel prevents the intrusion of formation water into the annular space thereby reducing corrosion of the metal casing. Apparently, no crosslinking agent is employed and for that reason is not believed that this particular gel would be useful for plugging channels or fractures on a permanent bases. Furthermore, in U.S. Pat. No. 2,832,414 the gel is used to fill a relatively large but stagnant cavity compared to the volume of a typical channel in a subterranean formation associated with hydrocarbon production from a wellbore.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol gels that were crosslinked with glutaric dialdehyde which were then converted to acetate gels by polymer homologous acetylation.

U.S. Pat. No. 3,265,657 discloses a process for preparing an aqueous polyvinyl alcohol composition, which remains fluid for at least a few seconds after preparation and spontaneously gels thereafter. The gel is formed by contacting a gelable fluid aqueous polyvinyl alcohol solution with a hexavalent chromium compound and a reductive agent to convert Cr(VI) to Cr(III). The compositions are used to produce foams suitable as insulating, acoustical, and packaging materials. The gels are crosslinked with chromium, not an aldehyde.

U.S. Pat. No. 3,658,745 discloses a hydrogel which is capable of significant expansion upon cooling in water and reversible shrinking upon heating which comprises a crosslinked acetalated hydrogel formed by reacting a polyvinyl alcohol previously dissolved in water and a monaldehyde and a dialdehyde. The hydrogels are alleged to have sufficient crosslinking to prevent imbibition of macromolecular materials such as proteins but not the imbibition of micromolecular materials such as low molecular weight water solutes. These hydrogels are alleged to be useful for dialytic purification when pure water is added to the macro-molecular solution after each cycle. Apparently these particular hydrogels are able to absorb and desorb water and microsolutes with alternate cooling and heating cycles. Apparently a major amount of shrinkage of these gels occurs upon slight heating such as from 12° to 37° C. which indicates that these gels would have little value for blocking water in subterranean formations, especially at temperatures of 37° C. or higher.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as dialdehyde or a substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehyde, glutaraldehyde, adipaldehyde, terephthaldehyde. Nonlimiting examples of dialdehyde derivatives are glyoxal bisulfite addition compound glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate dialdehydes in water, either alone or in response to an additional agent such as an acid or a condition such as heat are also meant to be included in the term "aldehyde" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" or "crosslinking catalyzing substance" as used herein is meant a substance which is a proton donor or a substance which in its environment will form or become a proton donor. All acids are operable as an acidic catalyst in the gel systems described herein, for example, Bronsted acids such as mineral and carboxylic acids, or Lewis acids. Non-limiting examples of a Lewis acid are zinc chloride, ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acids determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

The acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolysis more slowly than methyl formate at all temperatures including the higher temperatures. Therefore, where subterranean formations having higher temperatures are encountered, diactin or acetin because of their slower rate of hydrolysis are used to provide a longer time for crosslinking reactions to occur and hence provide a longer time for the gelling forming fluids to penetrate into the pores of such subterranean zones before gelation occurs. Non-limiting examples of delayed action catalyst and their acidic catalyst product are:

| Delayed Action Catalyst | Acidic Catalyst Product |
|---|---|
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein is meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules.

By the term "PVA based substance" or "PVA" (frequently referred to herein as the "first substance") as used herein is meant long-chain molecules selected from the group consisting of polyvinyl alcohols, polyvinyl alcohol copolymers, and mixtures thereof.

By the term "PVA-aldehyde gel" as used herein is meant a chemically crosslinked three-dimensional elastic network of longchain molecules selected from the group consisting of a polyvinyl alcohol, a polyvinyl alcohol copolymer, and mixtures thereof, crosslinked with an aldehyde, and containing a certain amount of immobilized and chemically bound water molecules.

By the term "PVA-glutaraldehyde gels" as used herein is meant a chemically three-dimensional elastic network of PVA based substance crosslinked with glutaraldehyde, and containing a certain amount of unmobilized and chemically bound water molecules.

By the term "water" as used herein, unless otherwise specified, is meant to include any source of water, including brine, sea water, brackish water, formation water, fresh water and pure water which is $H_2O$. Furthermore if the water is a brine, the brine can be saturated at an elevated temperature. By the term "aqueous" as used herein, unless otherwise specified, is meant to include aqueous solutions comprising such water. Thus, for example, an aqueous solution of the first substance is to be understood to include the first substance dissolved in brine or fresh water.

All of the above mentioned acidic catalysts are effective cross-linking catalyzing substances for PVA-glutaraldehyde gel systems.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alcohols.

It is disclosed in commonly assigned U.S. patent application Ser. No. 624,111 that PVA based gels can be formed at elevated temperatures by using a high concentration of glutaraldehyde as the crosslinking agent for forming the gel, and that by using a relatively higher concentration of glutaraldehyde that an acidic catalyst is not required for crosslinking. This discovery offers a very distinct advantage over other PVA-aldehyde gel systems in that it permits the gel-forming composition to be used in subterranean formations having high alkalinity where the alkaline material increases the pH of the gel-forming composition to levels which, if not basic, is sufficiently high that gelation will not occur or occurs only after a very long period of time which is too long to be of commercial value for retarding the flow of fluids. It is disclosed that the higher glutaraldehyde concentration somehow produces a slightly acidic condition in the gel-forming composition.

Unfortunately gels produced with high glutaraldehyde concentration tend to be less stable in the long run than gels having lower glutaraldehyde concentration. We have discovered that the amount of crosslinking agent, i.e., a second substance selected from the group consisting of aldehydes, aldehyde generating substances, acetals, acetal generating substances, and mixtures thereof capable of crosslinking with the first substance through the formation of acetal crosslinkages, and in particular glutaraldehyde, can be reduced by preheating the gel-forming composition to an elevated temperature for a period of time to effect a predetermined amount of partial crosslinking between the PVA and the aldehyde. After completing such partial crosslinking the gel-forming mixture can be cooled or allowed to cool to a lower temperature and still a gel will form within a period of time acceptable and useful for gelling in subterranean flow channels. However, if the gel-forming composition were not partially crosslinked as described above, but merely maintained at the lower temperature, then either the gel would not form, or if a gel does form it would take too long to form to be of any practical value in subterranean formations. Accordingly, there is provided herein an improved process for retarding fluid flow in the channels of a subterranean formation. In particular, in a subterranean formation having channels which have a high permeability to the flow of fluids, a process is provided for retarding fluid flow in the channels comprising providing a gel-forming composition which when substantially completely gelled in the high permeability channels is operable for retarding fluid flow therein, said gel-forming composition comprising (i.) an aqueous solution comprising a first substance selected from the group consisting of polyvinyl alcohols, polyvinyl alcohol copolymers, and mixtures thereof, and (ii.) an effective amount of a second substance selected from the group consisting of aldehydes, aldehyde generating substances, acetals, acetal generating substances, and mixtures thereof capable of crosslinking with the first substance through the formation of acetal crosslinkages, sufficient and operable to form a gel with said aqueous solution when said gel-forming composition is acidic; heating at least a part of the gel-forming composition to a preheat temperature which is higher than the average in situ temperature of the subterranean formation; maintaining the gel-forming composition at the preheat temperature for a period of time sufficient to effect a predetermined amount of partial crosslinking of the gel-forming composition thereby producing a partially crosslinked composition; introducing the partially crosslinked composition into the high permeability channels; and allowing the partially crosslinked composition to form a gel which is at least substantially completely gelled in the high permeability channels thereby retarding fluid flow in the channels.

In another embodiment the predetermined amount of partial crosslinking is sufficient to cause the partially crosslinked composition to substantially completely gel in the high permeability channels in a predetermined length of time. In one embodiment the predetermined length of time is no greater than about 5 days. In another embodiment the predetermined length of time is at least about ½ a day. In one embodiment the predetermined length of time is from about ½ a day to about 5 days.

In a further embodiment of the above process includes the steps comprising heating a second part of the gel-forming composition thusly provided to a second preheat temperature which is higher than the average in situ temperature of the subterranean formation; maintaining the second part of the gel-forming composition at the second temperature for a second period of time sufficient to effect a second predetermined amount of partial crosslinking of the gel-forming composition which is greater than the predetermined amount of partial crosslinking previously effected in the first part of the gel-forming composition introduced into the high permeability channels, thereby producing a higher partially crosslinked composition; introducing the higher partially crosslinked composition into the high permeability channels in back of or after the first partially crosslinked compositon; and allowing the higher partially crosslinked composition to form a gel which is at least substantially completely gelled in the higher permeability channels in back of or after the partially crosslinked composition first allowed to form a gel therein, thereby further retarding fluid flow in such high permeability channels. In a further embodiment, the second predetermined amount of partial crosslinking is sufficient to cause the higher partially crosslinked composition to substantially completely gel in the high permeability channels within a second predetermined length of time which is less than the first predetermined length of time. In yet a further embodiment the first predetermined length of time is no greater than about 5 days, and the second predetermined length of time is no greater than about 3 days. In still another embodiment, the first predetermined length of time in which the first part of the gel composition is gelled is at least about 2 days, and the second predetermined length of time in which the second part of the gel-forming composition forms a gel is at least about ½ a day.

In a further embodiment, the second preheat temperature to which the second part of the gel-forming composition is heated is higher than the first preheat temperature to which the first part of the gel-forming composition is heated. In yet another embodiment, the second period of time for which the second part of the gel-forming composition is maintained at the second preheat temperature is greater than the period of time for which the first part of the gel-forming composition is maintained at the first preheat temperature.

In another embodiment, the PVA based substance or first substance is polyvinyl alcohol and the second substance or aldehyde is glutaraldehyde or a glutaraldehyde generating substance. In a still further embodiment the concentration of second substance or glutaraldehyde in the gel-forming composition is less than about 4% and in yet another embodiment less than about 0.7% In another embodiment the molecular weight of the PVA based substance is at least about 30,000 and in another embodiment at least about 100,000. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000.

In another embodiment, the $H_2O$ content of the gel-forming composition is at least about 64% of the weight of the gel-forming composition or gel. In one embodiment water provides at least about 91% by weight of the gel-forming composition or gel. In one embodiment the water is a brine. Furthermore the brine can be saturated with dissolved salt and be hot or near its boiling point. Some hot saturated brines near their boiling points can contain as much as about 30% by weight dissolved salt or as little as about 70% by weight $H_2O$. Exact amounts of dissolved salt will vary depending on the various species of salts involved and the extent of any supersaturation. For example a gel-forming composition which is 91% by weight brine, wherein the brine is saturated and has a $H_2O$ content of 70% by weight, will be about 64% by weight $H_2O$.

In still another embodiment the preheat temperature is at least about 65° C. In another embodiment the preheat temperature is at least about 90° C., and in yet another embodiment the preheat temperature is at least about 125° C.

In another embodiment of the above process, the thusly provided gel-forming composition will not form a substantially complete gel within about a 5 day period of time in the channels without first being heated to an elevated temperature higher than the average in situ temperature of the subterranean formation for a period of time sufficient to effect the predetermined amount of partial crosslinking of the gel-forming composition. In yet another embodiment, the gel formed in the channels has a smaller degree of shrinkage after gelation than other gels formed in the channels from other gel-forming compositions, wherein the other gel-forming compositions have the same formulation as the gel-forming composition provided by this invention except that the other gel-forming compositions have a higher concentration of the second substance or aldehyde component than the gel-forming composition provided in this invention and, further, wherein the higher concentrations of second substance or aldehyde in such other gel-forming compositions are sufficient to form substantially completely gelled gels therefrom within a period of time no greater than about 5 days after being introduced into the channels without being preheated to, and maintained for a period of time at, a temperature higher than the average in situ temperature of the subterranean formation. In other words, the gels of this embodiment will not form a gel within 5 days of injection into the channels unless the gel is first preheated for a period of time sufficient to form a predetermined amount of crosslinking, whereas similar gels of the same composition, except for the fact that they have a higher second substance or aldehyde component concentration, will gel without preheating within a 5 day period of time after injection. These higher second substance or aldehyde component gels have a higher degree of shrinkage than the gels of this particular embodiment of this invention described herein.

In another embodiment of the above process the gel-forming composition will not form a substantially complete gel within about a 5 day period of time in 20 ml vial samples maintained at about 25° C. without first being heated to an elevated temperature of about 65° C. or higher for a period of time sufficient to effect the predetermined amount of partial crosslinking required to cause substantially complete gelation within the predetermined length of time. In a further embodiment, the gel-forming composition is such that when the partially crosslinked composition in the 20 ml vial sample is cooled or allowed to cool, to a temperature of about 25° C. or lower immediately after the preheat period, a gel will form within a length of time no greater than about 5 days, the gel being at least substantially completely gelled. In a further embodiment the gel thusly formed in the 20 ml vial sample has a smaller degree of shrinkage after gelation than other gels formed in 20 ml vial samples from other gel-forming compositions having the same formulation as the gel-forming composition provided in this embodiment except that the other gel-forming compositions have higher concentrations of the second substance or aldehyde than the gel-forming composition provided in this embodiment, and still further wherein the higher concentrations of second substance or aldehyde in other gel-forming compositions are sufficient to form substantially completely gelled gels therefrom within a length of time no greater than about 5 days after being formulated in the 20 ml vial samples without being preheated to, and maintained for a period of time at, a temperature of about 65° C. or higher.

In yet another embodiment of our invention the subterranean formation is an oil-bearing formation, and further comprising after allowing the partially crosslinked composition to form a gel in the high permeability channels, subjecting the oil-bearing formation to a waterflood operation thereby producing oil.

Most of the state-of-art gels, such as polyacrylamide based gels, used to block water in oil-bearing formations either have very little stability at elevated temperatures or in the presence of hard brines. PVA-aldehyde-water gel systems have much better stability at elevated temperatures, or in hard brines, or both. However, it has been found that some of the PVA-aldehyde-water gels will shrink at some point in time, sometimes after 40 days or longer, when held at elevated temperatures.

It has been found that very stable PVA based-glutaraldehyde-water gels can be made from gel-forming compositions having a low concentration of glutaraldehyde. For example, very stable gels have been formed from such gel-forming compositions where the glutaraldehyde concentration was about 0.5% by weight. Such low glutaraldehyde gels remain stable for longer periods of time at a temperature of 90° C. The difficulty with such low glutaraldehyde gel-forming compositions is that they take a very long time to gel or in some cases fail to produce a completely gelled gel. This disadvantage has been overcome in this invention by preheating the gel-forming compositions at an elevated temperature for a period of time sufficient to cause a predetermined amount of partial crosslinking of the gel-forming composition. After achieving the predetermined amount of partial crosslinking, the gel-forming composition is then injected into the reservoir where gelation is allowed to proceed to completion. The gel-forming composition becomes substantially completely gelled within a predetermined length of time which depends on such factors as the extent of the partial crosslinking of the composition before injection into the subterranean formation, the average in situ temperature of the formation, the pH of the gelling mixture when present in the flow channels, and the chemistry of the brine.

By determining the subterranean conditions that the particular gel-forming composition of interest will encounter, the proper amount of partial crosslinking required to substantially completely gel within a desired length of time after being injected into the formation can be determined. The length of time for gelation to occur is a factor in determining how far in-depth the gelling composition will penetrate into the formation and block the flow of fluids. Therefore, this invention is useful for many formations regardless of the formation temperature because it allows a lower amount of aldehyde to be used, thereby producing a more stable gel. For example, in high temperature formations a more stable gel can be formed by using a lower glutaraldehyde gel-forming composition which has been first partially crosslinked before it's injection into the subterranean formation. In low temperature formation, similar improved gels can be formed by providing a greater amount of partial crosslinking before injection.

In one embodiment, the gelling composition is partially crosslinked to such an extent that upon injection it will penetrate into the subterranean formation for about 4 days before completely gelling. This is followed with a second slug of gelling composition which has been partially crosslinked to a greater extent so that it will penetrate into the formation for about 3 days before completely gelling. Thus the second slug can be followed by a third slug of gelling composition which has been partially crosslinked to a still greater extent so that it will penetrate into the formation about 2 days before completely gelling. The third slug will form in the channels in back of or after the second slug. The process can be repeated with each succeeding slug of gelling composition being partially crosslinked to a greater extent than the former slug thereby decreasing the time for the composition to completely gel. The process permits the gel to be formed at greater distances from the wellbore and over greater lengths in the high permeability flow channels without the need for continually changing the formulation of the gel-forming composition while at the same time allowing the more stable gels having a low concentration of second substance, or aldehyde component, or glutaraldehyde component, to be placed in such channels regardless of the in situ formation temperature.

In one embodiment, the gelling composition is heated a short time to temperatures as high as about 125° C. or about 150° C. or higher thereby enabling the desired amount partial crosslinking to be accomplished relatively rapidly.

In yet another embodiment the gel-forming composition is preheated at a temperature of at least about $$T_p = (T_f + 60° C.)/1.3,$$

and preferably to a temperature of at least about $$T_p = (T_f + 50° C.)/1.2$$

where $T_p$ is the temperature, in ° C., to which the gel-forming composition is preheated and maintained for the predetermined period of time to effect the predetermined amount of partial crosslinking, and $T_f$ is the average subterranean formation temperature in ° C.

In still another embodiment, wherein the subterranean formation has a reservoir brine having a pH higher than 7, the process further comprises recovering a predetermined amount of the reservoir brine and adjusting the pH thereof to a value from about 5 to less than 7, and using the adjusted brine as at least a major part of the water of the gel-forming composition.

There is also provided a gel formed from a gel-forming composition comprising a PVA based substance, a second substance selected from the group consisting of aldehydes, aldehyde generating substances, acetals, acetal generating substances, and mixtures thereof capable of crosslinking with the first substance through the formation of acetal crosslinkages, said second substance being operable for crosslinking with the PVA based substance when the gel-forming composition is acidic, and water, by heating the gel-forming composition to a predetermined elevated temperature for a predetermined period of time sufficient to effect a predetermined amount of partial crosslinking of the gel-forming composition such that thereafter the gel-forming composition, when allowed to cool to a predetermined lower temperature, will form a gel at the predetermined lower temperature within a length of time from about 1/2 day to no greater than about 5 days, and wherein the gel-forming composition will not form a gel within about 5 days at the predetermined lower temperature unless the gel-forming composition is preheated to the predetermined elevated temperature for a length of time at least as long as the predetermined period of time.

In a further embodiment the predetermined elevated temperature is at least as high as about 65° C. and the predetermined lower temperature is no greater than about 25° C. In a further embodiment the predetermined elevated temperature is at least as high as about 80° C. and the predetermined lower temperature is no greater than about 50° C. In a still further embodiment the predetermined elevated temperature is at least as high as about 100° C. and the predetermined lower temperature is no greater than about 75° C. In yet another embodiment the predetermined elevated temperature is at least as high as about 125° C. and the predetermined lower temperature is no greater than about 95° C.

In still another embodiment the predetermined lower temperature is no greater than about $$T_L = 1.3\, T_E - 60°\ C.,$$

and preferably no greater than about $$T_L = 1.2\, T_E - 50°\ C.$$

where $T_E$ and $T_L$ are the predetermined elevated temperature and the predetermined lower temperature expressed in ° C. respectively.

In another embodiment the gel is formed from a gel-forming composition having at least about 64 percent of its weight as water, i.e. pure water or $H_2O$. In one embodiment the water of the gel-forming composition is provided by a brine, and the brine is at least about 91 percent of the weight of the gel-forming composition. In a further embodiment the brine is a reservoir brine. In a still further embodiment the brine is a reservoir brine with a pH higher than 7 which has been adjusted to a pH from about 6 to less than 7. In some embodiments it may be desirable to adjust the pH of the gel-forming composition from about 2 to about 5, but usually a pH from about 5 to less than 7 is preferred.

In one embodiment the gel is produced from a gel-forming composition wherein the second substance or aldehyde is from about 0.01 to less than about 4% of the weight of the gel-forming composition or gel. In another embodiment the second substance or aldehyde is glutaraldehyde or a glutaraldehyde generating substance; and in a still further embodiment the amount of second substance or glutaraldehyde is from 0.03 to less than about 4% of the weight of the gel-forming composition or gel.

In one embodiment the total aldehyde content of the gel-forming composition is from about 0.01 to about 4% of the weight of the gel-forming composition or thusly formed gel.

In another embodiment the gel is produced from a gel-forming composition wherein the PVA based substance is from about 1.5 to about 5% of the weight of the gel-forming composition or gel. In a further embodiment the PVA based substance is polyvinyl alcohol. In a preferred embodiment the first substance is from about 2 to about 3% of the weight of the gel-forming composition or gel. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weight for the first substance over 5,000,000 will probably form too viscous a solution to be useful. In one embodiment the average molecular weight of the first substance is about 125,000.

In yet another embodiment the gel is produced from a gel-forming composition which further comprises an acidic catalyst. In an alternative embodiment the gel is produced from a gel-forming composition wherein, other than the aldehyde and acidic substances produced by the conversion of a part of the aldehyde in the gel-forming composition, the gel-forming composition is substantially free of effective amounts of other acidic catalyst effective for promoting crosslinking of the PVA based substance and the aldehyde; and in a further embodiment the second substance or aldehyde is about 0.15 to less than about 4% of the weight of the gel-forming composition or gel.

In still further embodiments of the above described gels, the water used to form the gel has a hardness of at least about 1000 ppm. In further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm or more and can be a saturated brine.

In the embodiments of this invention the second substance or aldehyde crosslinks with the polyvinyl alcohol or polyvinyl alcohol copolymer through formation of acetals. It has been found that gels formed in this way are adaptable to the hardness of the water from which they are formed or exposed. These gels are also more stable at high temperatures than polyacrylamide based gels or gels made from biopolymers or polyvinyl alcohols gelled by other crosslinking agents such as borate.

Because of the adaptability and compatibility of these gels to water hardness or total dissolved solids content, these gels can be prepared using formation water, brackish water, sea water, brine, or usually any other available source of water conveniently at hand as well as fresh water or $H_2O$. Because the largest ingredient used to formulate the above described gels is principally water, substantial economic advantage is provided by this invention which permits gels to be formed with the cheapest source of available water. However, the advantages of this invention are not limited merely to economic advantages because these gels also provide substantial technical advantages over other gels. For example, in many of their uses these gels are subjected to the infusion of severely contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Due to their stability at elevated temperatures, the above described gels can also be formed and used in formations having an average in-situ or formation temperature of about 80° C. or higher, and in some embodiments where the average in-situ or formation temperature is 125° C. or higher.

The above described methods of forming a gel in situ in subterranean formations canbe practices using all of the gels provided by this invention.

The principles of this invention can be used where the subterranean water-conveying zone or flow channel, or nonproductive or high permeability part of a reservoir is under the subterranean hydrocarbon-producing formation; or where the subterranean water-conveying zone surrounds the subterranean hydrocarbon-producing formation; or where at least part of the subterranean water-conveying zone coincides with at least part of the subterranean hydrocarbon-producing formation. In one embodiment of this invention directed to a water flood operations, it frequently is desirable to treat the water injector wells with a polymer gel-forming solution to control the water flow profile. In this embodiment such treatment prevents channeling of water at the injector well and/or controls and/or redirects water flow through regions of varying peraeability. Since in this embodiment the polymer is injected as a relatively low viscosity aqueous phase it penetrates preferentially the region of highest permeability to water. Accordingly, after formation of the gel in high permeability regions, such regions are converted to low permeability to further retard water flow thereby causing, upon further water injection, a water sweep of previously inaccessible areas in the formation which usually have relatively low permeability. By extending the water flow to such previously inaccessible regions, more hydrocarbons can be recovered than would be recovered in the absence of such polymer treatment.

The gels of this invention have improved resistance to heat and are stable in hard water. These characteristics make these gels particularly useful for many oil field applications such as water mobility control. These gels can be advantageously used in other harsh environments such as solar pond construction where they can be used to consolidate loose soil and to retard or stop the leakage of brine through the pond floor, or to prevent convective flow from lower intervals containing hotter water into upper intervals containing cooler water. For oil field applications the gels of this invention provide excellent stability and durability.

Accordingly, one objective of this invention is to provide a means of controlling water movement in oil wells and subterranean formations especially in formations having temperatures 80° C. or higher, or where the waters involved are saline or hard.

Another object of this invention is to provide a means to thicken a gel water with an inexpensive polymer for other oil field developmental uses such as fracture fluids and fluids for secondary and tertiary oil recovery. It is another object of this invention to provide a gel which can be formulated using hard water and water containing a high level of dissolved solids such as sea water and formation water encountered in deep off-shore hydrocarbon fields.

Another object of this invention is to provide a gel which is stable at high temperatures and in particular more stable than other gels at such high temperatures.

DESCRIPTION OF THE PREFERRED EMBODIMENT

An oil well having an average in-situ temperature of about 50° C. or higher, and also having an undesirable amount of water production, is treated by injecting a polyvinyl alcohol-glutaraldehyde-water mixture into the wellbore and from the wellbore into the reservoir. The mixture contains about 2.5% polyvinyl alcohol having an average molecular weight of 125,000 or higher, about 0.5% glutaraldehyde, and the remainder a brine from the oil reservoir having a total dissolved solids content of about 50,000 and a hardness of about 5,000 ppm. The mixture is preheated for 4 hours at 90° C. and then injected into an oil reservoir. Crosslinking is completed and a gel is formed in situ in a period of time ranging from about 2 to about 3 days depending upon, in part, the alkalinity of the reservoir. The following examples demonstrate how some of the gels of this invention can be made and how some formulations will not gel upon cooling because of insufficient partial crosslinking during preheating at the elevated temperature.

EXAMPLE NO. 1

Figure 1:
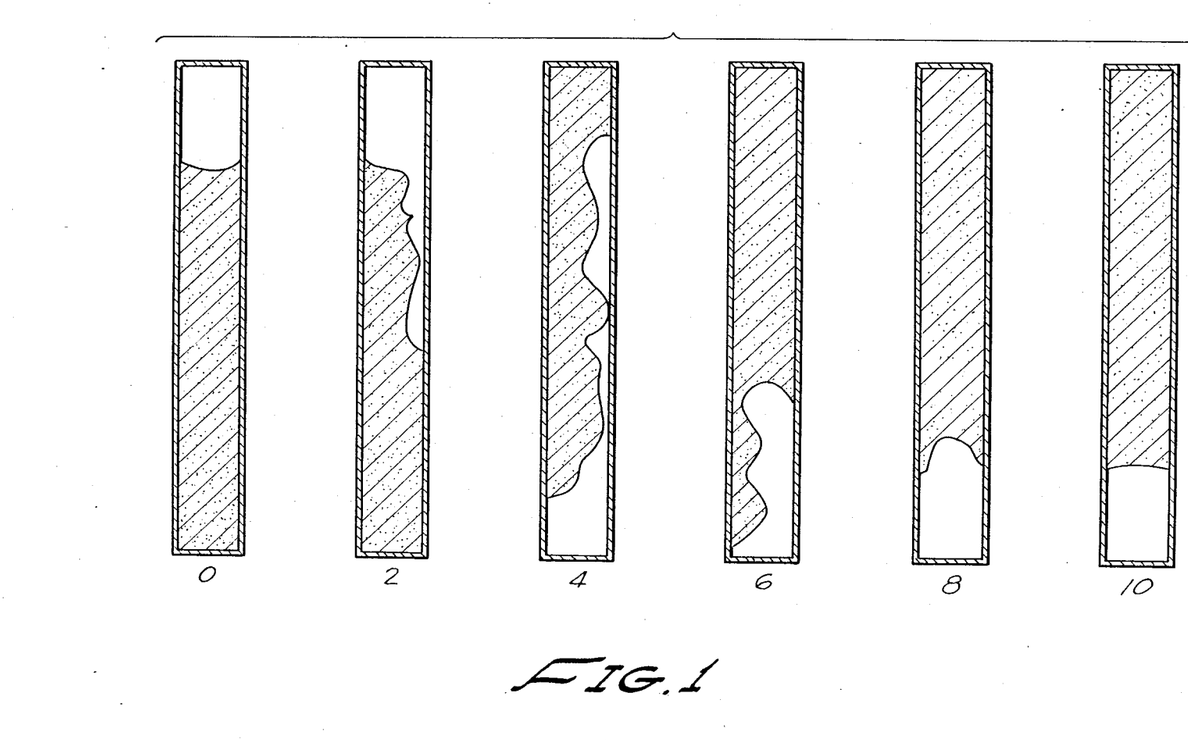
FIG. 1 is a diagram of a gel quality scale for grading gelation of gel-forming composition as referred to in FIG. 2.

Seven gel-forming compositions were formulated and preheated for various times according to the principles of this invention. All seven gel-forming compositions were made from a 2.5% by weight polyvinyl alcohol solution dissolved in synthetic brine A having a pH of about 7.0. Various amounts of glutaraldehyde were then added to the filtered samples. The samples were then preheated to, and maintained at, 93° C. for various predetermined periods of time, and immediately thereafter allow to cool to room temperature. The gels were then evaluated at various specified periods of time after preheating as shown in Table 1. The concentration of glutaraldehyde in the gel-forming composition, the duration of preheating of the gel-forming composition, and the resulting gel quality for the 7 tests, are given in Table 1. Gel quality was graded according to the scale as shown in FIG. 1. The seven diagrams in FIG. 1 represent the appearance of the gel-forming composition as it appeared in a 20 ml vial after the vial was turned upside down. The dark part represents the gel and the white part an air space in the vial. Gel quality ratings are shown under the lower end of each vial in FIG. 1. The gel quality rating corresponds to the following gelation states "0" no gel, "2" viscous liquid, "4" flowing gel, "6" soft gel, "8" semi firm gel, and "10" firm gel. Sample Nos. 3 and 4 of Table I demonstrate the principles of this invention. As shown by Sample No. 4, with 4 hours of preheating, a gel was formed after about 4 days; whereas as shown by Sample No. 3 with only 2 hours of preheating no gel was formed. The data shows that the gel time can be altered by maintaining the gel at the preheat temperature long enough to achieve a predetermined amount of partial crosslinking thereby enabling a full gel to be formed at a lower temperature. It is to be understood that the desired amount of crosslinking can be achieved by various combinations of elevated temperatures and preheating times. For example, 4 hours of preheating at 90° C. will produce a certain amount of partial crosslinking for a given gel-forming composition. This same amount of crosslinking can be achieved at lower preheat temperatures with longer preheat times or at higher preheat temperatures with shorter preheat times.

EXAMPLE NO. 2

Figure 2:
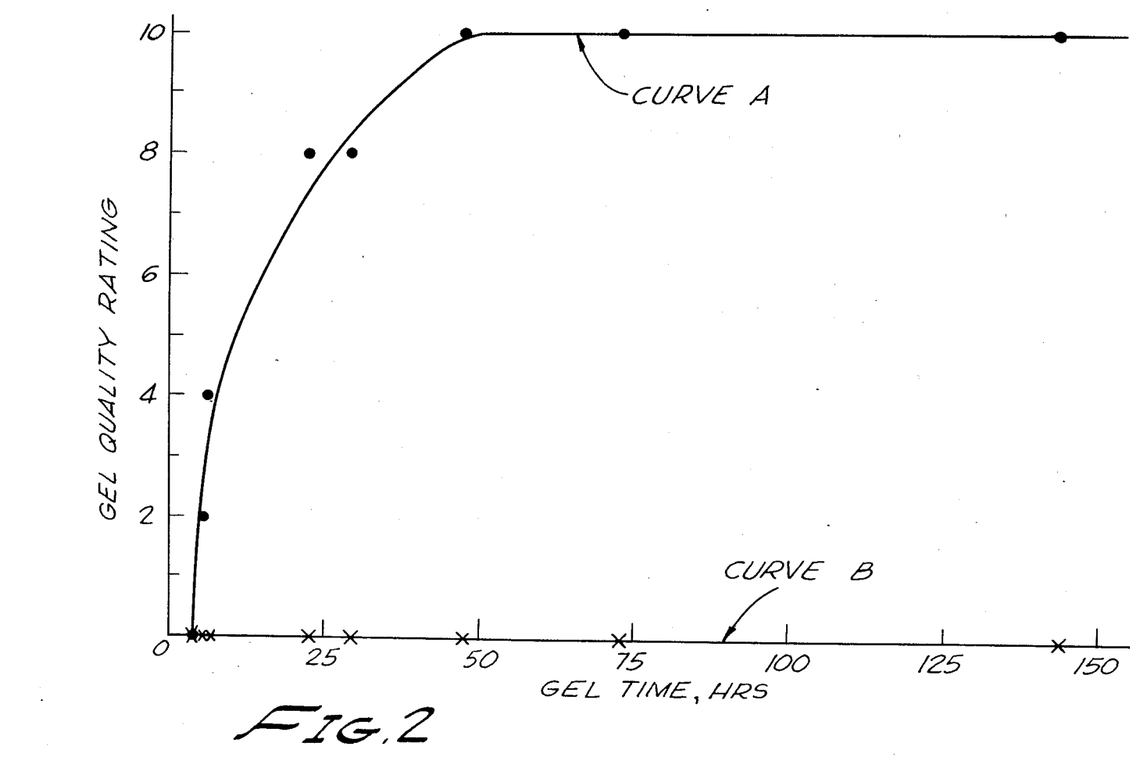
FIG. 2 is a graph of a gel quality for a polyvinyl alcohol-glutaraldehyde-brine system which demonstrates the effect of preheating the gel-forming composition during gelation.

FIG. 2 is a graph of gel quality as function of time for a gel-forming composition consisting of synthetic brine A having 2.5% polyvinyl alcohol and 2.0% of glutaraldehyde. Synthetic brine A was prepared by adding the following amounts of salts to deionized water and adjusting the volume to one liter:

| | |
|---|---|
| NaCl | 15.0 gr. |
| NaHCO$_3$ | 0.297 gr. |
| SrCl$_2$.6H$_2$O | 0.072 gr. |
| MgCl$_2$.6H$_2$O | 0.788 gr. |
| CaCl$_2$.2H$_2$O | 1.800 gr. |
| KCl | 0.186 gr. |
| BaCl$_2$.2H$_2$O | 0.072 gr. |

Brine A was filtered through a 0.22 micron filter before using for the various tests described herein.

The gel of Curve A was produced by preheating the above-described gel-forming composition for 4 hours at 93° C. and thereafter allowing it to cool to room temperature and gel. A complete gel was formed about 48 hours after preheating. This is to be compared to Curve B, which lies along the gel-time axis of the graph, which represents the same gelforming composition but without preheating. Curve A data points are shown by small circles and Curve B data points by small x's. As shown in the graph, without preheating no gel was formed even after about 144 hours and the composition was given a rating of zero. As shown in FIG. 1, a gel quality of zero means that no apparent gelation occurred.

The polyvinyl alcohol used in formulating the gel-forming composition in Example Nos. 2 and 3 was a commercial grade having an average molecular weight of about 126,000.

EXAMPLE NO. 3

This example demonstrates how to determine the relationship between the aldehyde concentration in the gel-forming composition, the preheat temperature, and the period of time the gel-forming composition is maintained at the preheat temperature, for a particular reservoir rock. Reservoir injection water (RIW) or reservoir brine is preferably used to produce the gel-forming composition. Polyvinyl alcohol having an average molecular weight of about 125,000 is added to RIW to produce a 2.5% concentration and the mixture heated to 95° C. for 45 minutes to completely dissolve the polymer.

A high pressure core holder is packed with crushed reservoir rock to form a 60 centimeters (60 cm) long, 5 cm diameter test core sample. The test core sample is saturated with RIW and heated to 50° C. in preparation for a flow test. RIW, at 50° C. is injected into the core sample at a rate of 30 cm per day and the pressure drop across the core sample measured. Mineral oil, at 50° C., having a viscosity of 10 centipoise (10 cp) at 25° C., is then pumped through the core sample at 30 cm per day until no more RIW is displaced therefrom. Additional RIW, at 50° C., is then pumped through the core sample at 30 cm per day until no more mineral oil is displaced therefrom and the pressure drop is measured.

The gel-forming composition is prepared by mixing 99 parts of the thusly prepared 2.5% polymer solution with 1 part by weight of a 50% aqueous glutaraldehyde solution (commercial grade). The thusly prepared gel-forming composition is then heated to a preheat temperature of 90° C. for 2 hours and immediately thereafter injected into the core sample at a rate of 30 cm per day until the gel point is reached which is indicated by a rapid increase in pressure. The actual gel time is compared to the nominal gel time in neutral rock. The variation of gel-time from nominal is an indication of the influence of the reservoir rock on crosslinking reaction rates.

EXAMPLE NO. 4

To determine the effect of preheat temperature on the amount of partial crosslinking of the polyvinyl alcohol and the glutaraldehyde, the test described in Example No. 3 is repeated except the preheat temperature is increased from 90 to 100° C.

EXAMPLE NO. 5

To determine the effect of the length of time of preheating on the amount of partial crosslinking of the polyvinyl alcohol and the glutaraldehyde, the test described in Example No. 3 is repeated except the duration of preheating the gel-forming composition is increased from 2 to 4 hours.

EXAMPLE NO. 6

Preferably after determining the optimum preheat temperature and duration to achieve a predetermined amount of partial crosslinking of the gel-forming composition in test core samples of crushed reservoir rock, for example as described in Example No. 3, treatment of an injection well experiencing water channeling or loss can be conducted with the desired gel-forming composition. For example, an injection well having a 30 meters (30 m) reservoir interval with the bottom 1.5 m thereof taking about 50% of the RIW, the bottom 3 m thereof taking about 75% of the RIW, and the bottom 6 m thereof taking about 100% of the RIW, and having an average interval permeability of about 200 millidarcies (200 md), porosity of about 20%, and reservoir temperature of 50° C., is receiving about 160 cubic meters per day (160 CMPD) of RIW at a surface pressure of about 20 kilograms per square centimeter gauge (20 kscmg). A 2.5% polyvinyl alcohol aqueous solution, formulated as in Example No. 3, is heated to 95° C. in a heater and stored in an insulated tank for at least about 45 minutes to completely dissolve the polymer. Preferably the residence time of the gel-forming composition in the heater is from about 1 to about 6 hours. The gel-forming composition is formulated from the 2.5% aqueous polymer solution and a commercial grade 50% glutaraldehyde aqueous solution as in Example No. 3, heated in a heater to a specific temperature, and injected into the interval according to the following program, in the following sequential order:

(a) heat 80 cubic meters of the gel-forming composition to 85° C. and inject at a rate of 160 CMPD, (b) heat 80 cubic meters of the gel-forming composition to 90° C. and inject at a rate of 160 CMPD, (c) heat 80 cubic meters of the gel-forming composition to 95° C. and inject at a rate of 160 CMPD, (d) heat 80 cubic meters of the gel-forming composition to 100° C. and inject at a rate of 160 CMPD, and (e) displace the gel-forming composition into the interval with RIW at a rate oF 160 CMPD without more than one cubic meter of overdisplacement, i.e., exceeding the volume of the wellbore by no more than one cubic meter.

During steps (a) through (e), the injection pressure is not allowed to increase above the fracture pressure of the reservoir. If it appears that the fracture pressure will be reached at an injection rate of 160 CMPD, then the injection rate is reduced so that the injection pressure will not reach the fracture pressure.

The well is then shut in for about 2 days, and thereafter waterflooding is resumed.

It is expected that the injection surface pressure will increase to about 50 kpscg during treatment, to about 80 kpscg after treatment, that 1 will take about 10% of the RIW, the the bottom 1.5 m of the interva bottom 3 m about 20%, the bottom 6 m about 25%, the bottom 12 m about 50%, with 100% of the RIW entering the entire interval.

Unless otherwise specified herein, all percents are weight percents.

The gels, the methods of forming the gels, and the processes for retarding the flow of fluids have some degree of flexibility. For example, if the environment in which the gels are to be used has a relatively high temperature, gel time can be slowed by using a smaller amount of second substance or aldehyde or glutaraldehyde and/or acidic catalyst. Similarly, if the environmental temperature is relatively low, gelation can be speeded by the use of larger amounts of second substance or aldehyde or glutaraldehyde and or acidic catalyst. Gel times can also be varied by the amount of partial crosslinking produced by the preheating step. Furthermore, it is permissible to use the formation brine of the subterranean zone as the water part of the gel-forming composition since the gel will form even with hard water or saturated brine as well as fresh or pure water, i.e., H20. Other variations of formulations, methods and processes will be apparent from this invention to those skilled in the art.

The foregoing disclosure and description of the present invention is illustrative and explanatory thereof and various changes in gel formation procedures and gel composition as well as the uses and applications of such gels to form them in situ in subterranean formations and to retard or block fluids in subterranean formations may be made within the scope of the appending claims without departing from the spirit of the invention. For example, many gel formulations can be produced and many methods of forming such gels in situ in subterranean formations will be apparent to one skilled in the art from this invention. For example, any number of sequential injection steps of the gel-forming compositions can be made. Furthermore, the necessary concentrations, amounts and sequence of injection of the gel-forming compositions can be tailored to suit the particular well or subterranean formation being treated.

TABLE 1

| Sample No. | 1 | 2 | 3 | 4 | 5 | 6 | 7 |
|---|---|---|---|---|---|---|---|
| (% GA) | 5 | 5 | 2 | 2 | 1 | 1 | 1 |
| Preheating Time (hrs) | 2 | 4 | 2 | 4 | 2 | 4 | 6.5 |
| Time After Preheating (hrs) | | | Gel Quality Rating (See FIG. 1) | | | | |
| 3.75 | 10 | — | 0 | — | 0 | 0 | 0 |
| 4.1 | 10 | 10 | 0 | 2 | 0 | 0 | 0 |
| 5.5 | 10 | 10 | 6 | 6 | 0 | 0 | 0 |
| 6.5 | 10 | 10 | 0 | 6 | 0 | 0 | 0 |
| 22.5 | 10 | 10 | 0 | 0 | 0 | 0 | 2 |
| 29.5 | 10 | 10 | 0 | 6 | 0 | 0 | 2 |
| 47.5 | 10 | 10 | 0 | 10 | 0 | 0 | 2 |
| 73 | 10 | 10 | 0 | 10 | 0 | 0 | 2 |
| 360 | 41% O.V. | 43% O.V. | 10 | 96% O.V. | 2 | 10 | 10 |

O.V. means original volume of the gel

What is claimed is:

1. In a subterranean formation having channels which have a high permeability to the flow of fluids, a process for retarding fluid flow in said channels comprising:
   (a) providing a gel-forming composition which when substantially completely gelled in said high permeability channels is operable for retarding fluid flow therein, said gel-forming composition comprising
   i. an aqueous solution comprising a first substance selected from the group consisting of polyvinyl alcohol, a polyvinyl alcohol copolymer, and mixtures thereof, and
   ii. an effective amount of a second substance selected from the group consisting of aldehydes, aldehyde generating substances, acetals, acetal generating substances, and mixtures thereof capable of crosslinking with the first substance through the formation of acetal crosslinkages, said second substance being operable for forming a gel with said aqueous solution when said gel-forming composition is acidic;
   (b) heating at least a part of said gel-forming composition to a preheat temperature which is higher than the average formation temperature of said subterranean formation;
   (c) maintaining said gel-forming composition at said preheat temperature for a predetermined period of time sufficient to effect a predetermined amount of partial crosslinking of said gel-forming composition thereby producing a partially crosslinked composition;
   (d) introducing said partially crosslinked composition into said high permeability channels; and
   (e) allowing said partially crosslinked composition to form a gel which is at least substantially completely gelled in said high permeability channels thereby retarding fluid flow in said channels.

2. The process of claim 1, wherein said gel-forming composition will not form a gel with a predetermined period of time not greater than about 5 days at said average formation temperature unless said gel-forming composition is heated to said preheat temperature for a length of time at least as long as said predetermined period of time mentioned in step (c).

3. The process of claim 1, wherein said predetermined amount of partial crosslinking mentioned in step (c) is sufficient to cause said partially crosslinked composition to substantially completely gel in said high permeability channels within a predetermined length of time no greater than about 5 days.

4. The process of claim 2, wherein said predetermined length of time is at least about 1/2 a day.

5. The process of claim 3, wherein said predetermined length of time is at least about 1/2 a day.

6. The process of claim 1, further comprising:
   (f) heating a second part of said gel-forming composition provided in step (a) to a second preheat temperature which is higher than said average formation temperature of said subterranean formation;
   (g) maintaining said second part of said gel-forming composition at said second preheat temperature for a second period of time sufficient to effect a second predetermined amount of partial crosslinking of said gel-forming composition which is greater than said predetermined amount of partial crosslinking effected in step (c), thereby producing a higher partially crosslinked composition;
   (h) introducing said higher partially crosslinked composition into said higher permeability channels after said partially crosslinked composition introduced in step (d); and
   (i) allowing said higher crosslinked gelled composition to form a gel which is at least substantially completely gelled in said high permeability channels in back of said partially crosslinked composition allowed to form a gel therein in step (e), thereby further retarding fluid flow in said channels.

7. The process of claim 6, wherein said predetermined amount of partial crosslinking mentioned in step (c) is sufficient to cause said partially crosslinked composition produced in step (c) to substantially completely gel in said high permeability channels within a first predetermined length of time; and wherein said second predetermined amount of partial crosslinking mentioned in step (g) is sufficient to cause said higher partially crosslinked composition produced in step (g) to substantially completely gel in said high permeability channels within a second predetermined length of time which is less than said first predetermined length of time.

8. The process of claim 7, wherein said first predetermined length of time is no greater than about 5 days; and wherein said second predetermined length of time is no greater than about 3 days.

9. The process of claim 8, wherein said first predetermined length of time is at least about 2 days; and wherein said second predetermined length of time is at least about ½ a day.

10. The process of claim 6, wherein said second preheat temperature to which said second part of said gel-forming composition is heated in step (f) is higher than said preheat temperature to which said gel-forming composition is heated in step (b).

11. The process of claim 6, wherein said second period of time for which said second part of said gel-forming composition is maintained at said second preheat temperature in step (g) is greater than said period of time for which said gelforming composition is maintained at said preheat temperature in step (c).

12. The process of claim 10, wherein said second period of time for which said second part of said gel-forming composition is maintained at said second preheat temperature in step (g) is greater than said period of time for which said gel-forming composition is maintained at said preheat temperature in step (c).

13. The process of claim 1, wherein said subterranean formation is an oil-bearing formation; and further comprising after allowing said partially crosslinked composition to form a gel in said high permeability channels, subjecting said oil-bearing formation to a waterflood operation thereby producing oil.

14. The process of claim 1, wherein said first substance is polyvinyl alcohol and said second substance is glutaraldehyde.

15. The process of claim 14, wherein the concentration of said glutaraldehyde in said gel-forming composition is less than about four percent.

16. The process of claim 14, wherein the concentration of said glutaraldehyde in said gel-forming composition is no greater than about 0.7 percent.

17. The process of claim 1, wherein said preheat temperature mentioned in step (b) is at least about 90° C.

18. The process of claim 1, wherein said preheat temperature mentioned in step (b) is at least about $$T_p = (T_f + 60° C.)/1.3$$

wherein $T_p$ is said preheated temperature in ° C., and $T_f$ is said average formation temperature in ° C.

19. The process of claim 1, wherein said preheat temperature mentioned in step (b) is at least about 65° C., and wherein said second substance is glutaraldehyde and the concentration of said glutaraldehyde in said gel-forming composition is less than about four percent.

20. The process of claim 1, wherein said preheat temperature mentioned in step (b) is at least about 65° C., and wherein said second substance is glutaraldehyde and the concentraction of said glutaraldehyde in said gel-forming composition is no greater than about 0.7 percent.

21. The process of claim 1, wherein said preheat temperature mentioned in step (b) is at least about 90° C. and wherein said second substance is glutaraldehyde and the concentration of said glutaraldehyde in said gel-forming composition is less than about four percent.

22. The process of claim 1, wherein said preheat temperature mentioned in step (b) is at least about 90° C., and wherein said second substance is glutaraldehyde and the concentration of said glutaraldehyde in said gel-forming composition is no greater than about 0.7 percent.

23. In a subterranean formation having channels which have a high permeability to the flow of fluids, a process for retarding the fluid flow in said channels comprising:
(a) providing a gel-forming composition which when substantially completely gelled in said high permeability channels is operable for retarding fluid flow therein, said gel-forming composition comprising
   i. an aqueous solution of polyvinyl alcohol, and
   ii. an effective amount of glutaraldehyde sufficient to form a gel with said aqueous solution when said gel-forming composition is acidic;
(b) heating at least a part of said gel-forming composition to a preheat temperature which is higher than the average formation temperature of said subterranean formation, and at least as high as about 65° C.;
(c) maintaining said gel-forming composition at said preheat temperature for a period of time sufficient to effect a predetermined amount of partial crosslinking of said gel-forming composition thereby producing a partially crosslinked composition;
(d) introducing said partially crosslinked composition into said high permeability channels; and
(e) allowing said partially crosslinked composition to form a gel which is at least substantially completely gelled in said high permeability channels thereby retarding fluid flow in said channels, and wherein said predetermined amount of partial crosslinking mentioned in step (c) is sufficient to cause said partially crosslinked composition to substantially completely gel in said high permeability channels within a predetermined length of time which is no greater than about 5 days.

24. The process of claim 23, wherein said predetermined length of time is at least about ½ a day.

25. The process of claim 23, further comprising:
(f) heating a second part of said gel-forming composition provided in step (a) to a second preheat temperature which is higher than the average formation temperature of said subterranean formation, and at least as high as about 65° C.;
(g) maintaining said second part of said gel-forming composition at said second preheat temperature for a second period of time sufficient to effect a second predetermined amount of partial crosslinking of said gel-forming composition which is greater than said predetermined amount of partial crosslinking effected in step (c), thereby producing a higher partially crosslinked composition;
(h) introducing said higher partially crosslinked composition into said higher permeability channels after said partially crosslinked composition introduced in step (d); and
(i) allowing said higher partially crosslinked composition to form a gel which is at least substantially completely gelled in said high permeability channels in back of said gel formed therein in step (e), thereby further retarding fluid flow in said channels, and wherein said second predetermined amount of partial crosslinking mentioned in step (g) is sufficient to cause said higher partially crosslinked composition produced in step (g) to substantially completely gel in said high permeability channels within a second predetermined length of time which is less than said predetermined length of time mentioned in step (e).

26. The process of claim 25, wherein said second predetermined length of time mentioned in step (i) is no greater than about 3 days.

27. The process of claim 26, wherein said predetermined length of time mentioned in step (e) is at least about 2 days; and wherein said second predetermined length of time mentioned in step (i) is at least about ½ a day.

28. The process of claim 25, wherein said second preheat temperature to which said second part of said gel-forming composition is heated in step (f) is higher than said preheat temperature to which said gel-forming composition is heated in step (b).

29. The process of claim 23, wherein the concentration of said glutaraldehyde in said gel-forming composition is less than about four percent.

30. The process of claim 23 wherein the concentration of said glutaraldehyde in said gel-forming composition is no greater than about 0.7 percent.

31. The process of claim 23, wherein the amount of said polyvinyl alcohol is about 2.5% by weight of the gel-forming composition; wherein the amount of glutaraldehyde is from about 0.7 to about 2% by weight of the gel-forming composition; wherein the average formation temperature of said subterranean formation is no greater than about 50° C.; and wherein said preheat temperature mentioned in step (b) is at least as high as about 80° C.

32. The process of claim 23, wherein the amount of said polyvinyl alcohol is about 2.5% by weight of the gel-forming composition; wherein the amount of glutaraldehyde is no greater than about 0.7% by weight of the gel-forming composition; wherein the average formation temperature of said subterranean formation is at least as high as about 75° C.; and wherein said preheat temperature mentioned in step (b) is at least as high as about 100° C.

33. The process of claim 1, wherein said gel-forming composition provided in step (a) will not form a gel in said channels without first being preheated to an elevated temperature higher than the average formation temperature of said subterranean formation for a period of time sufficient to effect said predetermined amount of said partial crosslink of said gel-forming composition mentioned in step (c).

34. The process of claim 1 further comprising adding an acidic catalyst to said gel-forming composition.

35. The process of claim 1 wherein said subterranean formation has a reservoir brine having a pH higher than 7, and further comprising recovering a predetermined amount of said reservoir brine and adjusting the pH thereof to a value from about 5 to less than 7, and using said adjusted brine as said water of said gel-forming composition.

36. The process of claim 1 wherein said preheat temperature mentioned in step (b) is at least about $$T_P = (T_f + 50° C.)/1.2$$

wherein $T_P$ is said preheated temperature in ° C., and $T_f$ is said average in situ temperature in ° C.

37. In a subterranean formation having channels which have a high permeability to the flow of fluids, a process for retarding fluid flow in said channels comprising:
(a) providing a gel-forming composition which when substantially completely gelled in said high permeability channels is operable for retarding fluid flow therein, said gel-forming composition comprising
 i. an aqueous solution comprising a first substance selected from the group consisting of polyvinyl alcohols, polyvinyl alcohol copolymers, and mixtures thereof, wherein said first substance is from about 1.5 to about 5% of the weight of said gel-forming composition, and
 ii. an effective amount of a second substance selected from the group consisting of aldehydes, aldehyde generating substances, acetals, acetal generating substances, and mixtures thereof capable of crosslinking with the first substance through the formation of acetal crosslinkages, said second substance being operable to form a gel with said aqueous solution when said gel-forming composition is acidic, wherein said second substance is from about 0.01 to less than about 4% of the weight of said gel-forming composition, and wherein $H_2O$ provides at least about 64% of the weight of said gel-forming composition;
(b) heating at least a part of said gel-forming composition to a preheat temperature which is higher than the average formation temperature of said subterranean formation;
(c) maintaining said gel-forming composition at said preheat temperature for a predetermined period of time sufficient to effect a predetermined amount of partial crosslinking of said gel-forming composition thereby producing a partially crosslinked composition, wherein said predetermined amount of partial crosslinking is sufficient to cause said partially crosslinked composition to substantially completely gel in said high permeability channels within a predetermined length of time no greater than about 5 days;
(d) introducing said partially crosslinked composition into said high permeability channels; and
(e) allowing said partially crosslinked composition to form a gel which is at least substantially completely gelled in said high permeability channels thereby retarding fluid flow in said channels.

38. In a subterranean formation having channels which have a high permeability to the flow of fluids, a process for retarding the fluid flow in said channels comprising:
(a) providing a gel-forming composition which when substantially completely gelled in said high permeability channels is operable for retarding fluid flow therein, said gel-forming composition comprising
 i. an aqueous solution of polyvinyl alcohol, wherein said polyvinyl alcohol is from about 1.5 to about 5% of the weight of said gel-forming composition, and
 ii. an effective amount of glutaraldehyde operable to form a gel with said aqueous solution when said gel-forming composition is acidic, wherein said glutaraldehyde is from about 0.01 to less than about 4% of the weight of said gel-forming composition, and wherein H₂0 provides at least about 64% of the weight of said gel-forming composition;

(b) heating at least a part of said gel-forming composition to a preheat temperature which is higher than the average formation temperature of said subterranean formation, and at least as high as about 65° C;

(c) maintaining said gel-forming composition at said preheat temperature for a period of time operable to effect a predetermined amount of partial crosslinking of said gel-forming composition thereby producing a partially crosslinked composition;

(d) introducing said partially crosslinked composition into said high permeability channels; and (e) allowing said partially crosslinked composition to form a gel which is at least substantially completely gelled in said high permeability channels thereby retarding fluid flow in said channels, and wherein said predetermined amount of partial crosslinking mentioned in step (c) is sufficient to cause said partially crosslinked composition to substantially completely gel in said high permeability channels within a predetermined length of time which is no greater than about 5 days.

39. The process of claim 37 wherein said predetermined length of time is at least about ½ day.

* * * * *